Jan. 3, 1939.  C. RAINESS  2,142,287
FASTENER
Filed May 24, 1938
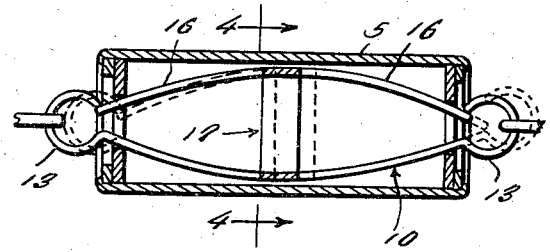
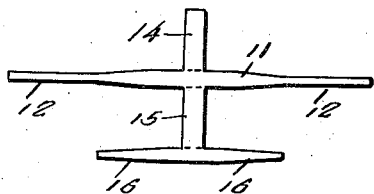
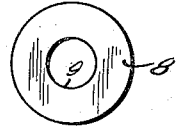
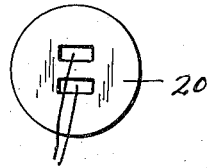
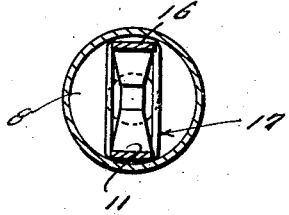
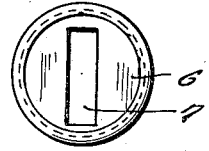
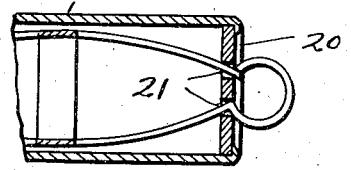
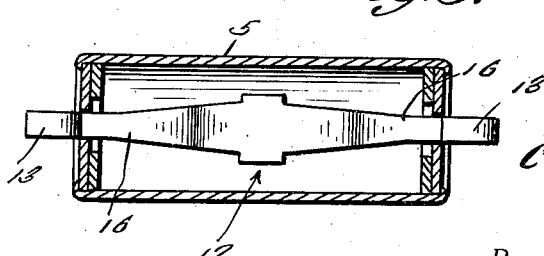
Inventor
Charles Rainess
By Clarence A. O'Brien
and Hyman Berman
Attorneys Patented Jan. 3, 1939

2,142,287

UNITED STATES PATENT OFFICE 2,142,287

FASTENER

Charles Rainess, South Euclid, Ohio

Application May 24, 1938, Serial No. 209,768

1 Claim. (Cl. 24—238)

This invention appertains to new and useful improvements in fasteners and more particularly to a fastener such as may be used in fastening the ends of necklaces and other articles of jewelry, or in fact various other elongated structures which must have their ends connected.

The principal object of the present invention is to provide a fastener for linking together elongated element ends which in use will require but a slight motion to fasten or unfasten the device.

Another important object of the invention is to provide a structure of the character stated which will be of simple construction and not susceptible to the ready development of defects.

These and various other important objects and advantages of the invention will become apparent to the reader of the following specification.

In the drawing:—

Figure 1 represents a longitudinal sectional view through the fastener.

Figure 2 is a plan view of the blank of the detent.

Figure 3 is an elevational view of one end disk.

Figure 4 is a cross section on the line 4—4 of Figure 1.

Figure 5 is a longitudinal sectional view through the case of the fastener.

Figure 6 is an end elevational view without the detent.

Figure 7 is a fragmentary longitudinal sectional view of a modified form of the invention.

Figure 8 is a plan view of the modified form of washer shown in Figure 7.

Referring to the drawing wherein like numerals designate like parts, it can be seen that the fastener consists of the shell 5 of cylindrical or in fact any other desired shape.

Each end of the shell 5 has a disk 6 suitably secured in place therein and having a rectangular-shaped opening 7 therein. Each of these disks 6 is backed by a second disk 8 having the circular opening 9 therein.

As is shown in Figure 1, the fastener includes the detent generally referred to by numeral 10 and the blank for this is shown in Figure 2.

The detent is stamped from one piece of metal and consists of the elongated element 11 having the reduced extensions 12—12 at its ends which are bent into hooks 13 as shown in Figure 1.

The blank is further formed with the laterally disposed arms 14—15 and the end portion of the arm 15 is provided with the laterally disposed fingers 16—16. The members 14—15 are bent to form the frame 17 (see Figure 4) which substantially holds the detent properly in the shell 5 but allows sliding action thereof.

A modified form of washer is shown in Figure 8, the same consisting of the disk 20 having a pair of parallel slots 21, therein through which the elongated elements 11 and spring members 16 extend to pass through the slot of the disk 6 at each end of the assembly, as shown in Figure 7.

The fingers 16 are sufficiently long as to tensionally engage against the free ends of the hooks 13 and it is to be understood that the entire blank as shown in Figure 2 is to be of spring metal.

It can now be seen, that with the portions 11 and the fingers 16 bearing against the edge portion of each of the disks 8 at its opening 9, any sliding action of the detent 10 will result in the flexing of one of the fingers 16 so that its free end will be separated from the free end of the corresponding hook 13 so that a link can be engaged or disengaged with respect to the said hook.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A fastener comprising a shell having restricted openings at the ends thereof, a detent assembly, each end of the assembly having a hook protruding through the corresponding end of the shell, said detent assembly including a spring finger for each of the hooks, the free end of each finger being adapted to engage the free end of its corresponding hook, each of the said fingers being adapted for riding engagement with the edge portion of the shell at the corresponding end thereof and adapted to be flexed away from its corresponding hook when the detent assembly is slid longitudinally in the shell.

CHARLES RAINESS.